US007340059B2

(12) United States Patent
Olsen et al.

(10) Patent No.: US 7,340,059 B2
(45) Date of Patent: Mar. 4, 2008

(54) PROGRAMMABLE SCRAMBLER AND DE-SCRAMBLER FOR DIGITAL TELEPHONY EQUIPMENT

(75) Inventors: Ronald D. Olsen, Lake View, NY (US); Jon C. Melnik, West Falls, NY (US)

(73) Assignee: Intel Corporation, Santa Clara, CA (US)

( * ) Notice: Subject to any disclaimer, the term of this patent is extended or adjusted under 35 U.S.C. 154(b) by 720 days.

(21) Appl. No.: 10/463,094

(22) Filed: Jun. 17, 2003

(65) Prior Publication Data

US 2005/0008161 A1 Jan. 13, 2005

(51) Int. Cl.
*H04K 1/00* (2006.01)
*H04L 17/02* (2006.01)
*H04L 9/00* (2006.01)
*H04N 7/167* (2006.01)

(52) U.S. Cl. ...................... 380/276; 341/173; 380/268; 380/42; 380/209

(58) Field of Classification Search ................ 380/276, 380/268, 42, 209; 341/173
See application file for complete search history.

(56) References Cited

U.S. PATENT DOCUMENTS 5,432,853 A * 7/1995 Yamamoto ................... 380/46
5,835,488 A * 11/1998 Sugita ........................ 370/335
5,859,912 A * 1/1999 Hershey et al. ............... 380/42
6,339,781 B1 * 1/2002 Sasaki ........................ 708/252
6,631,488 B1 * 10/2003 Stambaugh et al. ........ 714/746
6,667,708 B2 * 12/2003 Schooler et al. ............ 341/173
6,735,606 B2 * 5/2004 Terasawa et al. ........... 708/252
6,816,876 B2 * 11/2004 Jha et al. ..................... 708/252
7,308,104 B1 * 12/2007 Kim et al. .................. 380/268
2002/0174152 A1 * 11/2002 Terasawa et al. ........... 708/250
2003/0223397 A1 * 12/2003 Iacono et al. ............... 370/342

OTHER PUBLICATIONS

"Description of a Prior Art Practice: Fig. A", contents originally filed Jun. 17, 2003. 2 pgs.

* cited by examiner

*Primary Examiner*—Emmanuel Moise
*Assistant Examiner*—Techane J. Gergiso
(74) *Attorney, Agent, or Firm*—Buckley, Maschoff & Talwalkar LLC

(57) ABSTRACT

A scrambler circuit for digital telephony equipment receives a sequence of input bits, generates the sequence of output bits based on the input bits and stores the sequence of output bits. The generating of the sequence of output bits includes selecting at least one of the stored output bits in accordance with contents of a mask register, and applying a logic operation to a current input bit and the selected at least one stored output bit to provide a current output bit.

9 Claims, 8 Drawing Sheets

PROGRAMMABLE SCRAMBLER AND DE-SCRAMBLER FOR DIGITAL TELEPHONY EQUIPMENT

BACKGROUND

Digital telephony devices, including digital switches, digital PBXs (private branch exchanges) and digital telephones, are well known. In a typical installation of a digital PBX, various kinds of digital telephony equipment may be connected to the PBX. These kinds of digital telephony equipment may include telephones and other devices, such as a voice mail system, an interactive voice response unit (IVRU), and/or telephone emulators. In other cases, digital switch emulators may be connected to digital telephones. The signals exchanged between two pieces of digital telephony equipment are typically serial signals. These signals may be entirely or partially scrambled according to various scrambling algorithms in order to prevent long sequences of zeros or ones, and/or to help provide confidentiality for the signals. The scrambling algorithms used by manufacturers of digital telephony equipment often vary from manufacturer to manufacturer. It can therefore be difficult and/or costly to provide digital telephony equipment that is compatible with the equipment of many different manufacturers.

DETAILED DESCRIPTION

Figure 1:
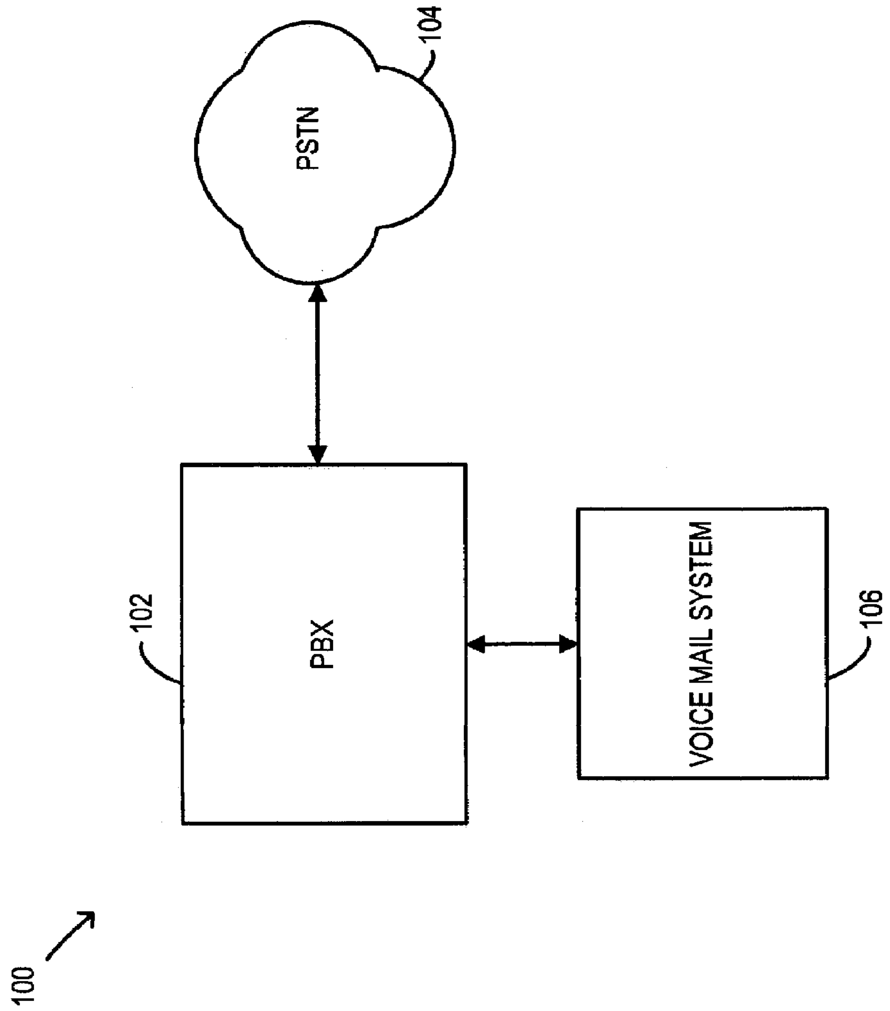
FIG. 1 is a block diagram of a telecommunication system provided according to some embodiments.

FIG. 1 is a block diagram of a telecommunication system 100 provided according to some embodiments. The telecommunication system 100 includes a PBX 102 which is connected to the public switched telephone network (PSTN) 104. Also included in the telecommunication system 100 is a voice mail system 106 that is coupled to the PBX 102. The PBX 102 may be provided in accordance with conventional practices. As will be seen, the voice mail system 106 may include scrambler and de-scrambler circuits provided according to some embodiments. To simplify the drawing, other components that may be coupled to the PBX 102 are not shown in the drawing. For example, the other components connected to the PBX 102 may include telephones, telephone emulators, an interactive voice response unit (IVRU), etc.

Figure 1A:
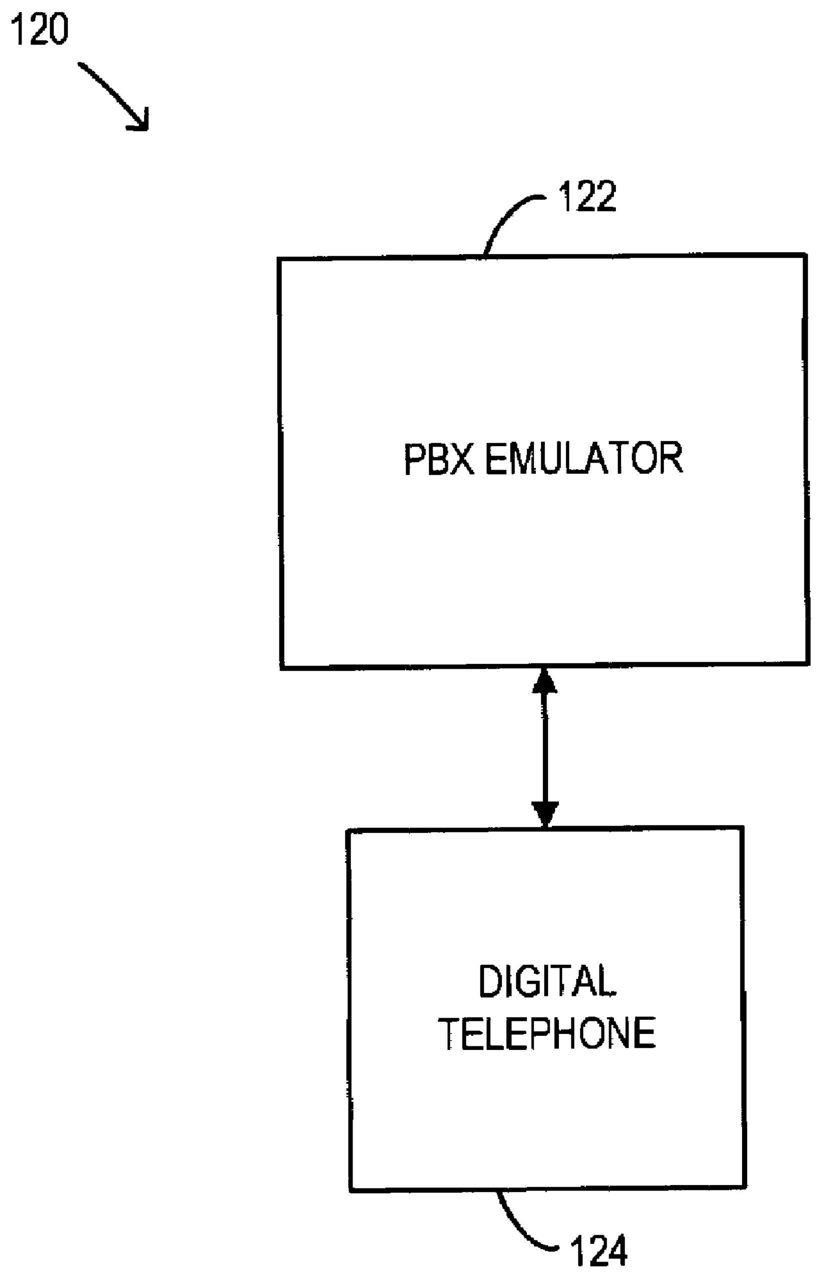
FIG. 1A is a block diagram of a telecommunication system provided according to some other embodiments.

FIG. 1A is a block diagram of a telecommunication system 120 provided according to some other embodiments. The telecommunication system 120 includes a PBX emulator 122 and a digital telephone 124 that is connected to the PBX emulator 122. The telecommunication system 120 may include other components, such as other digital telephones connected to the PBX emulator 122, which are not shown so as to simplify the drawing. Some or all of the signals exchanged between the PBX emulator 122 and the digital telephone 124 may be scrambled.

Figure 1B:
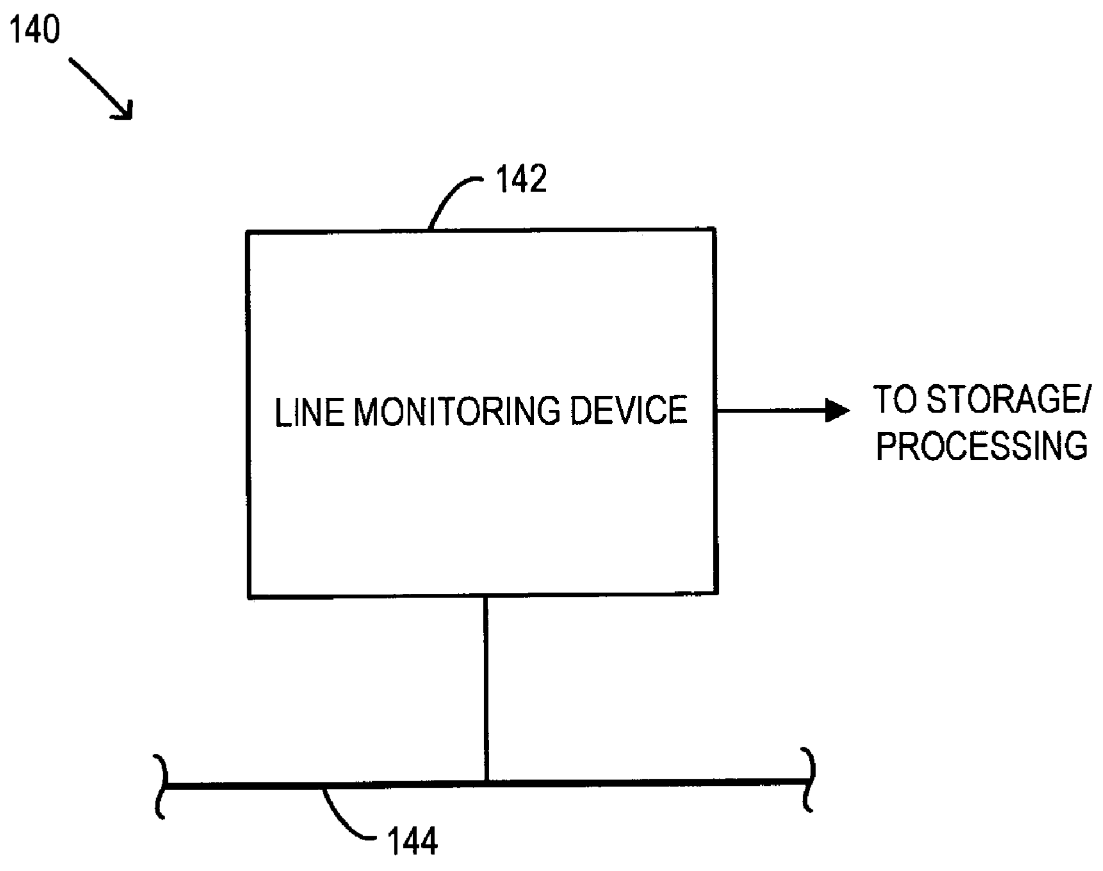
FIG. 1B is a block diagram of a telecommunication system provided according to still other embodiments.

FIG. 1B is a block diagram of a telecommunication system 140 provided according to still other embodiments. The telecommunication system 140 includes a line monitoring device 142 connected to a telecommunication line 144. The telecommunication line 144 may interconnect two pieces of telephony equipment which are not shown. The line monitoring device 142 may pick up a voice signal from the telecommunication line 144 for monitoring or recording for security and/or quality control applications. The line monitoring device 142 may scramble the voice signal picked up from the telecommunication line 144 before transmitting the scrambled voice signal for processing and/or storage.

Figure 2:
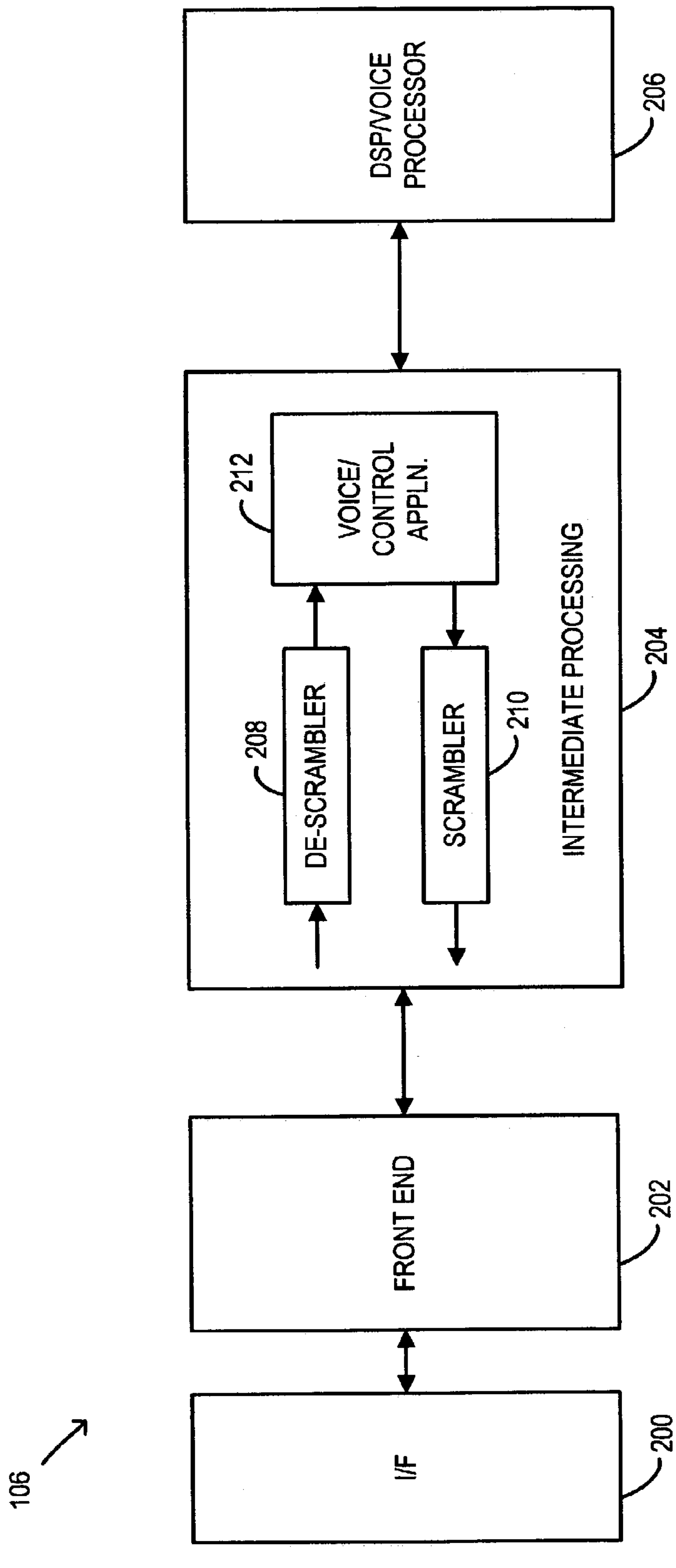
FIG. 2 is a block diagram of a voice mail system that is part of the telecommunication system of FIG. 1.

FIG. 2 is a block diagram of the voice mail system 106 (FIG. 1). The voice mail system 106 includes an interface 200 which is suitable to be coupled to an item of telephony equipment such as PBX 102. The voice mail system 106 also includes front end electronics 202 which are coupled to the interface 200. The front end electronics 202 receive and condition inbound signals received via the interface 200. The front end electronics 202 also couple outbound signals to the interface 200.

Also included in the voice mail system 106 is an intermediate signal processing block 204, which is coupled to the front end electronics 202. The voice mail system 106 further may include, in some cases, a digital signal processor (DSP) or voice processor 206 which is coupled to the intermediate signal processing block 204. To simplify the drawing, other components of the voice mail system 106, such as storage components for voice messages, are not shown.

The intermediate signal processing block 204 includes a de-scrambler circuit 208 that de-scrambles inbound serial digital signals received via the interface 200 and the front end electronics 202. The intermediate signal processing block 204 also includes a scrambler circuit 210 that scrambles outbound serial digital signals to be transmitted to the PBX 102 (FIG. 1) via the front end electronics 202 and the interface 200. The output of the de-scrambler circuit 208 and the input of the scrambler circuit 210 may be coupled to a suitable voice processing and/or control application 212. It will be appreciated that both the de-scrambler circuit 208 and the scrambler circuit 210 are coupled to the interface 200 via the front end electronics 202. Except for the scrambler circuit 210 and the de-scrambler circuit 208, the voice mail system 106 may be constructed entirely in accordance with conventional practices.

Figure 3:
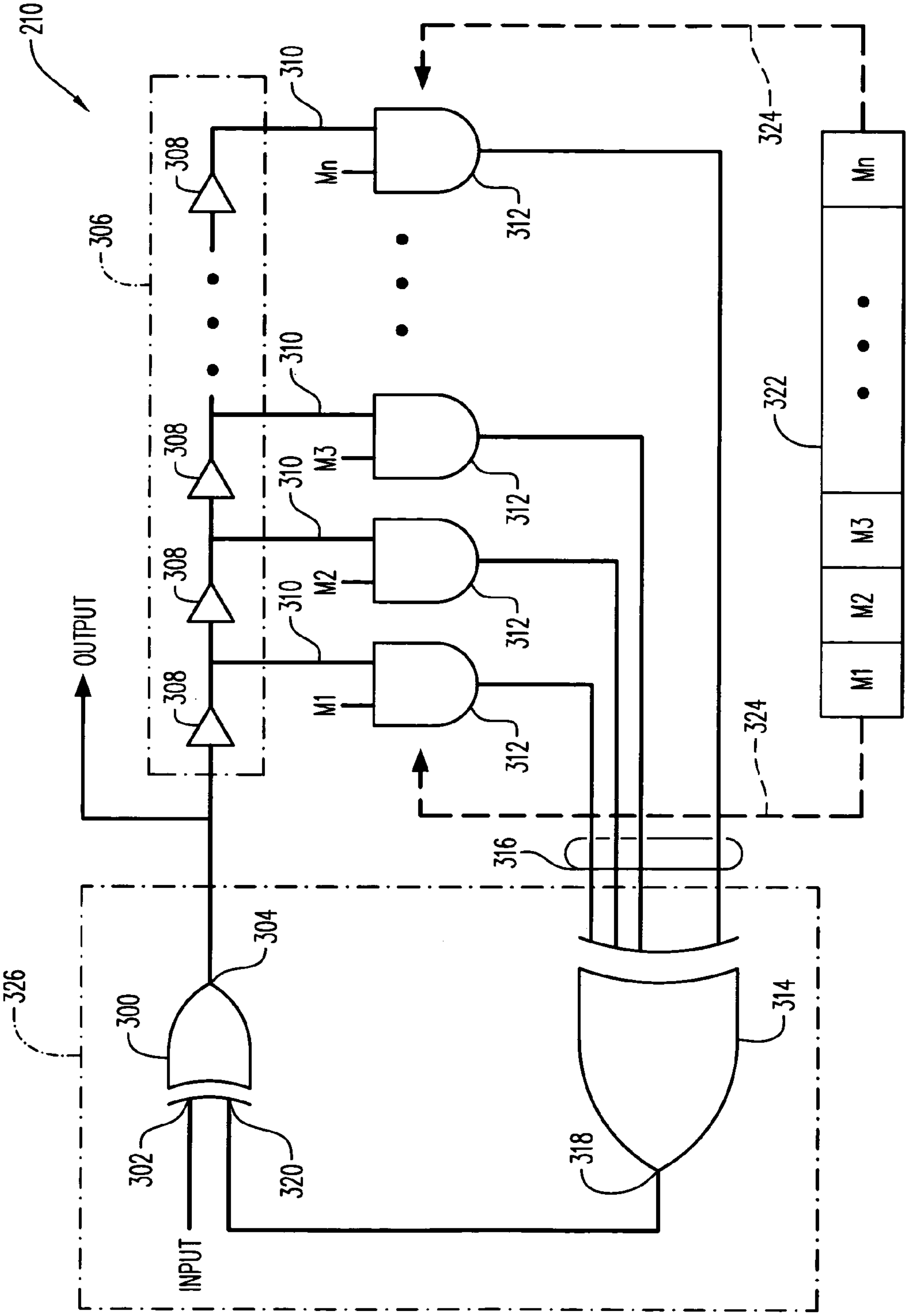
FIG. 3 is a schematic logic diagram of a scrambler circuit that is part of the voice mail system of FIG. 2.

FIG. 3 is a schematic logic circuit diagram of the scrambler circuit 210 as provided according to some embodiments.

The scrambler circuit 210 includes an XOR (exclusive OR) gate 300. The XOR gate 300 has an input 302 which receives the input signal for the scrambler circuit 210. The XOR gate 300 also has an output 304 which supplies the output from the scrambler circuit 210.

The scrambler circuit 210 also includes a shift register 306 which is coupled to the output 304 of the XOR gate 300 and which is represented by a series of delay elements 308. The shift register 306 has a plurality of taps 310, each of which is associated with the output of a respective one of the delay elements 308.

The scrambler circuit 210 further includes AND gates 312, each of which has one of its inputs coupled to a respective one of the taps 310 of the shift register 306.

Also included in the scrambler circuit 210 is an MXOR (multi-exclusive OR) gate 314. "MXOR gate" refers to a logic gate that has three or more inputs and which provides a "true" output only when an odd number of the inputs to the gate are true. "MXOR gate" also includes a logic gate that has three or more inputs and which provides a "true" output only when one and only one of the inputs is true.

The MXOR gate 314 has inputs 316, each of which is coupled to the output of a respective one of the AND gates 312. The MXOR gate 314 also has an output 318, which is coupled to an input 320 of the XOR gate 300.

The scrambler circuit 210 also includes a mask register 322 which is capable of storing mask register bits M1 to Mn. It should be understood that n is an integer greater than 2, and that n may be the number of delay elements 308 constituting the shift register 306, the number of taps 310 of the shift register 306, the number of AND gates 312 and the number of inputs 316 of the MXOR gate 314. In some embodiments, n may equal 16, meaning that the shift register 306 has 16 delay elements 308 and 16 taps 310, the number of AND gates is 16, the number of inputs 316 of the MXOR gate is 16, and the mask register 322 stores 16 mask register bits. Alternatively, the scrambler circuit 210 may be constructed such that n is a number other than 16.

The mask register 322 is coupled to the AND gates 312, as indicated by the dashed-arrow marks 324. More specifically, each of the mask register bits M1 to Mn is coupled to an input of a respective one of the AND gates 312, to control the respective AND gate 312. Thus each AND gate 312 has one input coupled to a respective tap 310 of the shift register 306 and has its other input coupled to a respective mask register bit stored in the mask register 322.

Although the XOR gate 300 and the MXOR gate 314 are depicted separately in FIG. 3, these two gates may be considered to form, and/or may be implemented as, a single logic circuit 326, which has as inputs the input 302 (for receiving the input signal, a sequence of input bits) and the inputs 316 (each coupled to the output of a respective one of the AND gates 312), and having as an output the output 304. It should also be appreciated that the AND gates 312 effectively couple the mask register 322 to the shift register 306 so that "1" bits stored in the mask register 322 select corresponding bits stored in the shift register 306. The bits stored in the shift register 306 have previously been output from the XOR gate 300 and consequently may be considered to be output bits. The logic circuit 326 formed of the XOR gate 300 and the MXOR gate 314 generates each output bit based on a current input bit received at the XOR gate 300 and those of the output bits stored in the shift register 306 which are selected by "1" bits stored in the mask register 322. Thus, assuming that only two of the mask register bits stored in the mask register 322 have the value "1", the output of the scrambler circuit 210 can be represented as the following polynomial function of the input:

$$X^j+X^i+I,$$

where I is the current input bit, i and j correspond to the positions in the mask register 322 of the "1" bits stored therein, $X^i$ is the output bit at the ith tap 310 of the shift register 306 (corresponding to the output bit from i cycles ago), and $X^j$ is the output bit at the jth tap 310 of the shift register 322 (corresponding to the output bit from j cycles ago) and "+" represents an XOR logical operation.

For example, mask register bits M5 and M9 of the mask register 322 may be set to "1", with all other mask register bits "0", to program the scrambler circuit 210 to provide an output equal to:

$$X^9+X^5+I,$$

which may be the scrambling algorithm expected by the PBX 102 (FIG. 1).

Figure 4:
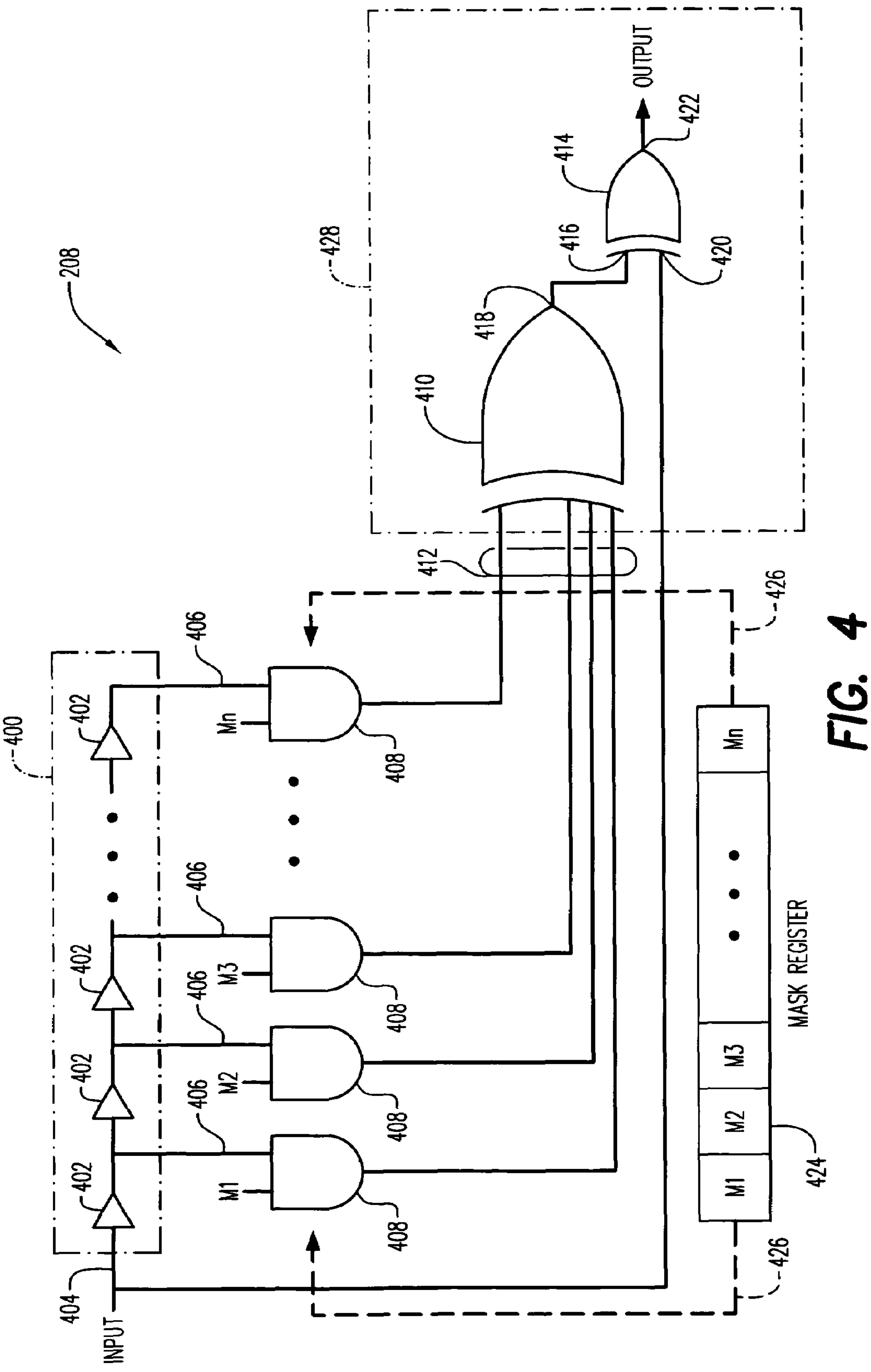
FIG. 4 is a schematic logic diagram of a de-scrambler circuit that is part of the voice mail system of FIG. 2.

FIG. 4 is a schematic logic circuit diagram of the de-scrambler circuit 208 as provided according to some embodiments.

The de-scrambler circuit 208 includes a shift register 400, which is represented by a series of delay elements 402. The shift register 400 has an input 404 which receives the input signal for the de-scrambler circuit 208. The shift register 400 also has a plurality of taps 406, each of which is associated with the output of a respective one of the delay elements 402.

The de-scrambler circuit 208 also includes AND gates 408, each of which has one of its inputs coupled to a respective one of the taps 406 of the shift register 400.

The de-scrambler circuit 208 further includes an MXOR gate 410. The MXOR gate 410 has inputs 412, each of which is coupled to the output of a respective one of the AND gates 408.

Also included in the de-scrambler circuit 208 is an XOR gate 414. The XOR gate 414 has an input 416 coupled to the output 418 of the MXOR gate 410 and a second input 420 that is coupled in common with the input 404 of the shift register 400 to receive the input signal for the de-scrambler circuit 208. The XOR gate 414 also has an output 422 which supplies the output from the de-scrambler circuit 208.

The de-scrambler circuit 208 also includes a mask register 424 which is capable of storing mask register bits M1 to Mn. As before, n may be an integer greater than 2, and may be the number of delay elements 402 constituting the shift register 400, the number of taps 406 of the shift register 400, the number of AND gates 408 and the number of inputs 412 of the MXOR gate 410. In some embodiments, as in the case of the scrambler circuit 210, n may equal 16, meaning that the shift register 400 has 16 delay elements 402 and 16 taps 406, the number of AND gates in the de-scrambler circuit 208 is 16, and the mask register 424 stores 16 mask register bits. Alternatively, the de-scrambler circuit 208 may be constructed such that n is a number other than 16. The value of n applicable to the de-scrambler circuit 208 need not be the same as the value of n for the scrambler circuit 210.

The mask register 424 is coupled to the AND gates 408, as indicated by the dashed arrow marks 426. More specifically, each of the mask register bits M1 to Mn of the mask register 424 is coupled to an input of a respective one of the AND gates 408, to control the respective AND gate 408. Thus each AND gate 408 has one input coupled to a respective tap 406 of the shift register 400 and has its other input coupled to a respective mask register bit stored in the mask register 424.

Although the MXOR gate 410 and the XOR gate 414 are depicted separately in FIG. 4, these two gates may be considered to form, and/or may be implemented as, a single logic circuit 428, which has as inputs the inputs 412 (each coupled to the output of a respective one of the AND gates 408) and the input 420 (for receiving the input signal of the de-scrambler circuit 208, the input signal being a sequence of input bits), and having as an output the output 422. It should also be appreciated that the AND gates 408 effectively couple the mask register 424 to the shift register 400 so that "1" bits stored in the mask register 424 select corresponding bits stored in the shift register 400. The bits stored in the shift register 400 are input bits received via the input 404. The logic circuit 428 formed of the MXOR gate 410 and the XOR gate 414 generates each output bit based on a current input bit received at the input 420 of the XOR gate 414 and based on those of the input bits stored in the shift register 400 which are selected by "1" bits stored in the mask register 424. Thus the de-scramble algorithm to be performed by the de-scramble circuit 208 may be programmed by storing an appropriate bit pattern in the mask register 424.

To give a concrete example, if the PBX 102 utilizes the scramble algorithm $X^9+X^5+I$, the de-scrambler circuit 208 may be suitably programmed to perform the corresponding de-scramble algorithm by loading "1" bits as mask register bits M5 and M9 in the mask register 424, with the other bits in the mask register 424 having the value "0".

In operation, processing of an outbound signal by the voice mail system 106 will first be described.

Referring to FIG. 2, the outbound signal may originate from the DSP or voice processor 206 (or may pass through the DSP or voice processor 206 after originating from a storage device which is not shown). The outbound signal may then pass through the voice processing and/or control application 212 to the scrambler circuit 210. The signal provided to the scrambler circuit 210 is in the form of a serial digital signal. In some embodiments, all of the outbound signal may be provided to the scrambler circuit 210 for scrambling. In some other embodiments, only some of the outbound signal, such as only control signal portions or only voice signal portions of the outbound signal, may be presented to the scrambler circuit 210 for scrambling.

Referring now to FIG. 3, it may be assumed that the mask register 322 has been suitably programmed so that the scrambler circuit 210 will perform a scrambling algorithm that is compatible with the requirements of the PBX 102. The outbound signal is received as an input signal for the scrambler circuit 210 in the form of a sequence of input bits at the input 302 of the XOR gate 300. Based on the current input bit and the current output of the MXOR gate 314, the XOR gate 300 performs an XOR logical operation to provide a current output bit. The current output bit is a bit in a sequence of output bits that form the output of the scrambler circuit 210. Also, a portion of the sequence of output bits corresponding to the length of the shift register 306 is stored in the shift register 306. Certain of the mask register bits M1 to Mn in the mask register 322 (e.g., exactly 2 of the mask register bits) have been set to "1" to program the scrambler circuit 210. These "1" mask register bits cause the corresponding AND gates 312 to which the "1" mask register bits are coupled to pass to the inputs 316 of the MXOR gate 314 the corresponding output bits stored in the shift register 306. (The corresponding output bits are the bits at the particular taps 310 that are coupled to the particular AND gates 312 selected by the "1" mask register bits.) Thus the "1" mask register bits select certain ones of the stored output bits. All the other inputs to the MXOR gate 314 receive "0" inputs.

On the basis of the selected stored output bits, the MXOR gate 314 provides an output to the input 320 of the XOR gate 300. In the case where exactly two of the mask register bits are set to "1", the MXOR gate 314 provides a "0" output if the two selected stored output bits are both "0" or both "1"; otherwise, the MXOR gate 314 provides a "1" output. Thus, in this case, the MXOR gate 314 applies an XOR operation to the two selected stored output bits.

The output of the MXOR gate 314 (which may be considered an intermediate output signal) is provided to the input 320 of the XOR gate 300, which performs a logical XOR operation with respect to the current input bit (received at input 302 of the XOR gate 300) and the output of the MXOR gate 314 to produce an output bit at the output 304 of the XOR gate 300. The resulting sequence of output bits produced by the XOR gate 300 is a scrambled version of the sequence of input bits, according to a scrambling algorithm that is programmed based on the contents of the mask register 322. As noted above, the sequence of output bits is also coupled to the shift register 306 for storage therein.

The scrambled output signal provided by the scrambler circuit 210 is transmitted to the PBX 102 (FIG. 1) via the front end electronics 202 (FIG. 2) and the interface 200. At the PBX 102 an appropriate de-scrambling algorithm is applied to recover the original, unscrambled signal.

Processing of an inbound signal by the voice mail system 106 will now be described.

The inbound signal may be received from the PBX 102 (FIG. 1) via the interface 200 (FIG. 2) and the front end electronics 202. Some or all of the inbound signal may have been scrambled by the PBX 102. The scrambled portion of the inbound signal is supplied to the de-scrambler circuit 208. The scrambled portion of the inbound signal is presented to the de-scrambler circuit 208 in the form of a serial digital signal.

Referring to FIG. 4, the mask register 424 has previously been programmed so that the de-scrambler circuit 400 is configured to perform a suitable de-scrambling algorithm to recover the original signal as it was before scrambling by the PBX 102. For example, if the PBX had applied the scrambling algorithm represented by the polynomial $X^9+X^5+I$, then the mask register 400 may be programmed by setting mask register bits M5 and M9 to "1", with all other mask register bits therein having a "0" value.

The scrambled inbound signal, received as a sequence of input bits at input 404 of the shift register 400, is sequentially stored therein, while also being sequentially provided to the input 420 of the XOR gate 414.

The mask register bits which have a "1" value cause the corresponding AND gates 408 to which the "1" mask register bits are coupled to pass to the inputs 412 of the MXOR gate 410 the corresponding input bits stored in the shift register 400. (The corresponding stored input bits are the bits at the particular taps 406 that are coupled to the particular AND gates 408 selected by the "1" mask register bits.) Thus the "1" mask register bits select certain ones of the stored input bits. All the other inputs to the MXOR gate 410 receive "0" inputs.

On the basis of the selected stored input bits, the MXOR gate 410 provides an output to the input 416 of the XOR gate 414. In the case where exactly two of the mask register bits are set to "1", the MXOR gate 410 provides a "0" output if the two selected stored input bits are both "0" or both "1"; otherwise, the MXOR gate 410 provides a "1" output. Thus, in this case, the MXOR gate 410 applies an XOR operation to the two selected stored input bits.

The output of the MXOR gate 410 (which may be considered an intermediate output signal) is provided to the input 416 of the XOR gate 414, which performs a logical XOR operation with respect to the current input bit (received at the input 420 of the XOR gate 414) and the output of the MXOR gate 410 to produce an output bit at the output 422 of the XOR gate 414. The resulting sequence of output bits corresponds to the original signal before scrambling at the PBX 102, and may then be processed by the voice processing and/or control application 212 (FIG. 2) and the DSP or voice processor 206.

Figure 5:
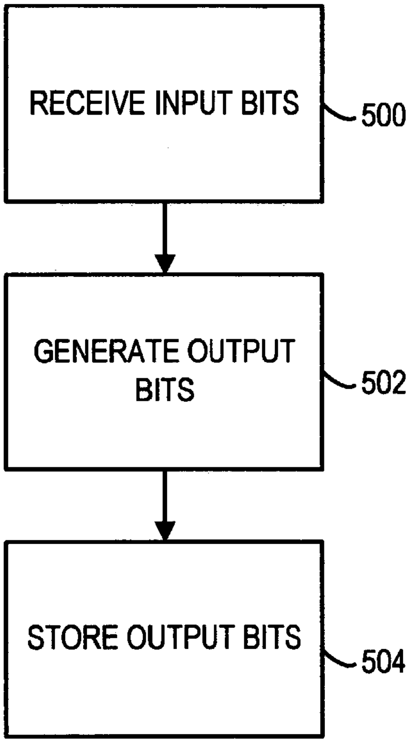
FIGS. 5 and 6 are flow charts that illustrate functions performed by the scrambler circuit of FIG. 3.
Figure 6:
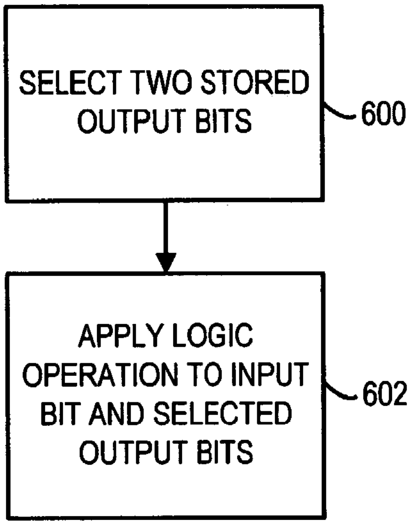

An overview of functions performed by the scrambler circuit 210 is illustrated by the flow charts shown in FIGS. 5 and 6. Referring initially to FIG. 5, it is indicated at 500 that the scrambler circuit 210 receives a sequence of input bits (via input 302 of XOR gate 300; FIG. 3). At 502 in FIG. 5 it is indicated that the scrambler circuit 210 generates a sequence of output bits based on the input bits. This is done by the combined operation and interaction of the shift register 306, the AND gates 312, the mask register 322, the MXOR gate 314 and the XOR gate 300. Also, as indicated at 504 in FIG. 5, the scrambler circuit 210 stores the sequence of output bits (by operation of the shift register 306).

FIG. 6 illustrates some details of the function of generating the sequence of output bits. As indicated at 600 in FIG. 6 (and assuming that exactly two of the mask register bits have "1" values), exactly two of the output bits stored in the shift register 306 are selected. This is done by the respective AND gates 312 that correspond to the "1" mask register bits. As indicated at 602, the logic circuit 326 (composed of the XOR gate 300 and the MXOR gate 314) applies a logic operation to the current input bit (at the input 302 of the XOR gate 300) and the stored output bits selected at 600 to provide a current output bit. In particular, in some embodiments, the MXOR gate 314 applies a first logic sub-operation to the selected two stored output bits to provide an intermediate output signal, and the XOR gate 300 applies a second logic sub-operation to the intermediate output signal and the current input bit to provide the current output bit.

Figure 7:
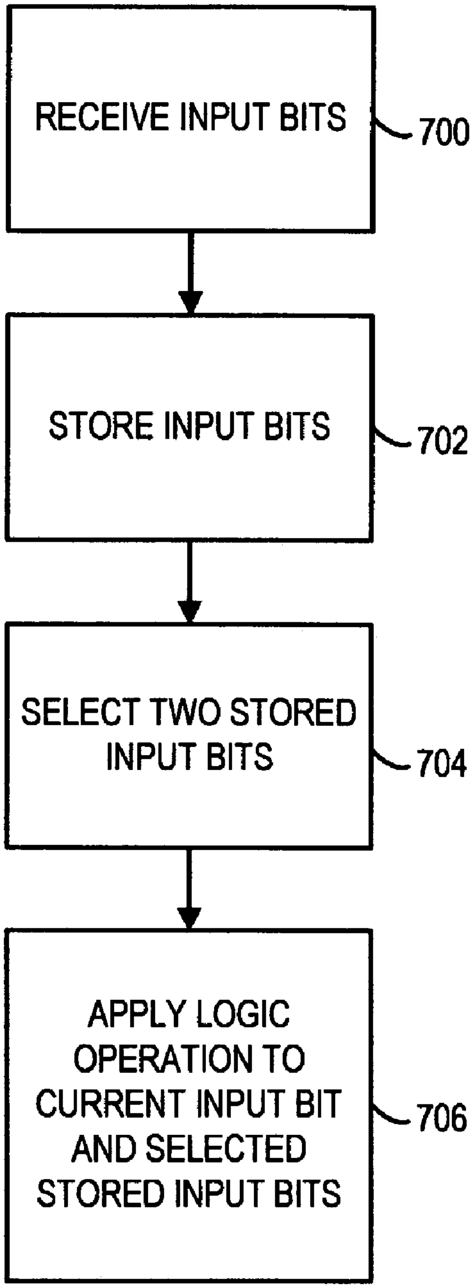
FIG. 7 is a flow chart that illustrates functions performed by the de-scrambler circuit of FIG. 4.

An overview of functions performed by the de-scrambler circuit 208 is illustrated by the flow chart shown in FIG. 7. As indicated at 700 in FIG. 7, the de-scrambler circuit 208 receives a sequence of input bits (supplied in parallel to input 404 of the shift register 400 and to the input 420 of the XOR gate 414; see FIG. 4). At 702 in FIG. 7 it is indicated that the sequence of input bits is stored by the de-scrambler circuit 208 (by operation of the shift register 400). As indicated at 704 (and assuming that exactly two of the mask register bits of the mask register 424 have "1" values), exactly two of the input bits stored in the shift register 400 are selected. This is done by the respective AND gates 408 that correspond to the "1" mask register bits of the mask register 424. As indicated at 706, the logic circuit 428 (composed of the MXOR gate 410 and the XOR gate 414) applies a logic operation to the current input bit (at input 420 of the XOR gate 414) and the stored input bits selected at 704 to provide a current output bit. In particular, in some embodiments, the MXOR gate 410 applies a first logic sub-operation to the selected two stored output bits to provide an intermediate output signal, and the XOR gate 414 applies a second logic sub-operation to the intermediate output signal and the current input bit to provide the current output bit.

A device which includes embodiments of the programmable scrambler circuit and/or the programmable de-scrambler circuit as illustrated above can be readily configured to be compatible with the respective proprietary scrambling and de-scrambling algorithms of PBXs provided by a number of different manufacturers. The appropriate configuration of the scrambler and/or de-scrambler circuit can be easily performed by programming a mask register or mask registers. Thus a single telephony device may have the flexibility to be installed supporting the scramble algorithms of a considerable number of different PBXs. Also, the scramble and de-scramble algorithms can be easily modified in the field if a scrambler circuit and/or de-scrambler circuit of one of the above embodiments is employed.

The scrambler and/or de-scrambler circuits may also be programmed so as to provide scrambling for the purpose of maintaining confidentiality of communications.

The mask register 322 shown in FIG. 3 and the mask register 424 shown in FIG. 4 are indicated as separate items, but in some embodiments the de-scrambler circuit 208 and the scrambler circuit 210 may share a single mask register which is coupled to both the shift register 306 of the scrambler circuit 210 and the shift register 400 of the de-scrambler circuit 208, assuming that the same scramble algorithm is used for both inbound and outbound signals. In other words, the mask register 322 and the mask register 424 may be the same mask register.

In an embodiment described above, exactly two of the mask register bits in each mask register have "1" values. However, in other embodiments the number of "1" valued mask register bits may be one, or may be three or more.

The scrambler and/or de-scrambler circuits may be realized, for example, with one or more FPGAs (field programmable gate arrays). Alternatively, one or both of the scrambler and de-scrambler functions may be implemented by suitably programming a general purpose processing device (not shown) and coupling a mask register or mask registers to the processing device. It is well within the ability of those who are skilled in the art to provide the software required to implement the scrambler or de-scrambler functions based on the schematic illustrations of FIGS. 3 and 4.

For purposes of illustration, the scrambler and de-scrambler circuits have been shown as parts of a voice mail system. However, in other embodiments, the scrambler and/or de-scrambler circuits may be included in other types of telephony devices. For example, the de-scrambler circuit 208 and the scrambler circuit 210 may be incorporated in the PBX emulator 122 shown in FIG. 1A. Also, the scrambler circuit 210 may be incorporated in the line monitoring device 142 shown in FIG. 1B. The de-scrambler circuit 208 and the scrambler circuit 210 may also be incorporated, for example, in IVRUs, digital telephones or telephone emulators.

Other equivalent logic arrangements may be provided in place of the specific logic shown in FIGS. 3 and 4.

Thus, in some embodiments, a method may include receiving a sequence of input bits, generating a sequence of output bits based on the input bits, and storing the sequence of output bits. The generating of the sequence of output bits may include selecting at least one of the stored output bits in accordance with contents of a mask register, and applying a logic operation to a current input bit and the selected at least one stored output bit to provide a current output bit.

Also, in some embodiments, a method may include receiving a sequence of input bits, storing the sequence of input bits, selecting at least one of the stored input bits in accordance with contents of a mask register, and applying a logic operation to a current input bit and the selected at least one stored input bit to provide an output bit.

Further, in some embodiments, an apparatus may include a logic circuit having a plurality of inputs and an output, and a shift register coupled to the output of the logic circuit and having a plurality of taps. The apparatus may also include a plurality of gates each having a respective input coupled to one of the taps and a respective output coupled to a respective one of the inputs of the logic circuit. The apparatus may further include a mask register coupled to the plurality of gates and capable of storing a plurality of bits, each bit stored in the mask register to control a respective one of the gates.

Embodiments of both the scrambler circuit disclosed above and the de-scrambler circuit disclosed above may be described as including a shift register having a plurality of taps; a logic circuit having a plurality of inputs and an output; a plurality of gates each having a respective input coupled to one of the taps and a respective output coupled to a respective one of the inputs of the logic circuit; and a mask register coupled to the plurality of gates and capable of storing a plurality of bits, each bit stored in the mask register to control a respective one of the gates. In the case of the de-scrambler circuit, the shift register may store input bits. In the case of the scrambler circuit, the shift register may store output bits produced by the logic circuit.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. An apparatus comprising:

an interface to be coupled to an item of telephony equipment; and a scrambler coupled to the interface to provide an output signal to the interface, the scrambler including:

a logic circuit having a plurality of inputs and an output, one of said inputs for receiving an input signal to be scrambled by said scrambler, said input signal including a sequence of input bits, said output for supplying said output signal to said interface, said output signal including output bits;

a shift register coupled to the output of the logic circuit and having a plurality of taps, said shift register for storing ones of said output bits;

a plurality of gates each having a respective input coupled to one of the taps and a respective output coupled to a respective one of the inputs of the logic circuit; and a mask register coupled to the plurality of gates and capable of storing a plurality of bits, each bit stored in the mask register to control a respective one of the gates.

2. The apparatus of claim 1, wherein the logic circuit includes:

an XOR (exclusive OR) gate having an output coupled to the shift register; and an MXOR (multi-exclusive OR) gate having a plurality of inputs each coupled to the output of a respective one of the plurality of gates and an output coupled to an input of the XOR gate.

3. The apparatus of claim 2, wherein each of the plurality of gates is an AND gate having an input coupled to a respective bit of the mask register.

4. An apparatus comprising:

an interface to be coupled to an item of telephony equipment; and a de-scrambler coupled to the interface to receive from the interface an inbound signal to be de-scrambled, the de-scrambler including:

a shift register having a plurality of taps, said shift register coupled to the interface to store bits of said inbound signal;

a logic circuit having a plurality of inputs and an output, one of said inputs of said logic circuit coupled to said interface to receive said inbound signal, said output of said logic circuit for outputting a de-scrambled inbound signal;

a plurality of gates each having a respective input coupled to one of the taps and a respective output coupled to a respective one of the inputs of the logic circuit; and a mask register coupled to the plurality of gates and capable of storing a plurality of bits, each bit stored in the mask register to control a respective one of the gates.

5. The apparatus of claim 4, wherein the logic circuit includes:

an XOR (exclusive OR) gate having a first input and a second input, the second input being coupled in common with an input of the shift register; and an MXOR (multi-exclusive OR) gate having a plurality of inputs each coupled to the output of a respective one of the plurality of gates and an output coupled to the first input of the XOR gate.

6. The apparatus of claim 5, wherein each of the plurality of gates is an AND gate having an input coupled to a respective bit of the mask register.

7. An apparatus comprising:

an interface to be coupled to an item of telephony equipment;

a scrambler coupled to the interface to provide an output signal to the interface; and a de-scrambler coupled to the interface to receive an input signal;

wherein the scrambler includes:

a first logic circuit having a plurality of inputs and an output;

a first shift register coupled to the output of the logic circuit and having a plurality of taps;

a first plurality of gates each having a respective input coupled to one of the taps of the first shift register and a respective output coupled to a respective one of the inputs of the first logic circuit; and a mask register coupled to the first plurality of gates and capable of storing a plurality of bits, each bit stored in the mask register to control a respective one of the first plurality of gates;

and the de-scrambler includes:

a second shift register separate from said first shift register and having a plurality of taps;

a second logic circuit separate from said first logic circuit and having a plurality of inputs and an output; and a second plurality of gates separate from said first plurality of gates, each of said second plurality of gates having a respective input coupled to one of the taps of the second shift register and a respective output coupled to a respective one of the inputs of the second logic circuit;

the mask register also being coupled to the second plurality of gates and each bit stored in the mask register also being capable of controlling a respective one of the second plurality of gates.

8. The apparatus of claim 7, wherein each of the first plurality of gates is an AND gate having an input coupled to a respective bit of the mask register.

9. The apparatus of claim 7, wherein each of the second plurality of gates is an AND gate having an input coupled to a respective bit of the mask register.

* * * * *